Figure 6:
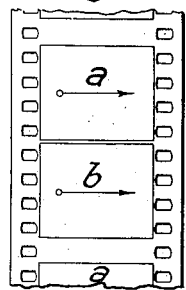

April 28, 1931.    O. PILNY ET AL    1,802,530
METHOD AND A DEVICE FOR PRODUCING COLOR FILMS
Filed Nov. 3, 1927    2 Sheets-Sheet 1
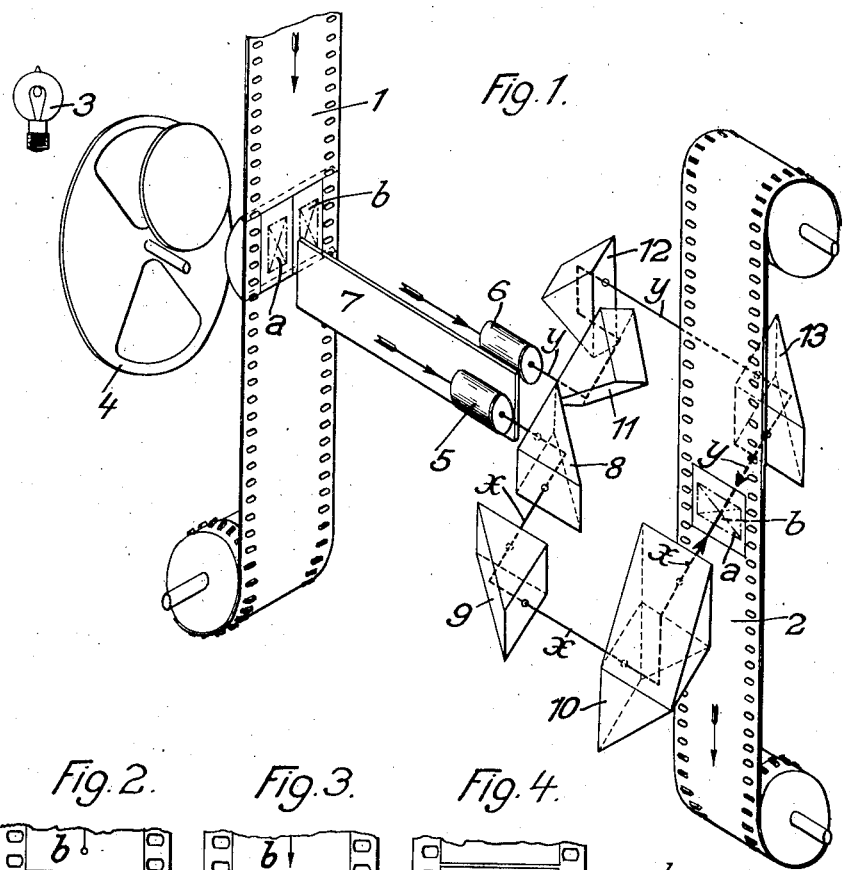
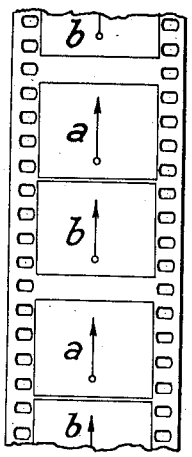 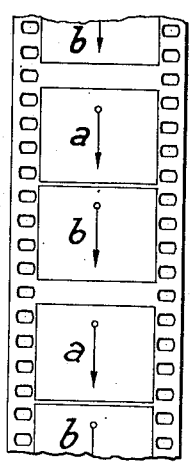 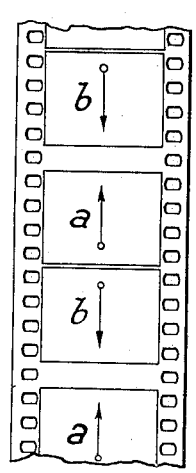 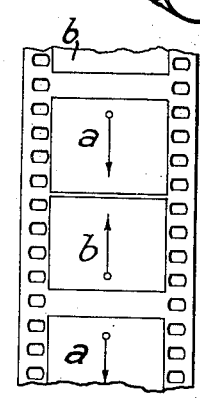
Inventors:
Otto Pilny
Alex Pilny
By Henry Orth Jr
Atty.

Inventor:
Otto Pilny
Alex Pilny

Patented Apr. 28, 1931

1,802,530

UNITED STATES PATENT OFFICE

OTTO PILNY AND ALEX PILNY, OF ZURICH, SWITZERLAND

METHOD AND A DEVICE FOR PRODUCING COLOR FILMS

Application filed November 3, 1927, Serial No. 230,818, and in Switzerland September 1, 1927.

The subject matter of the present invention is a method for producing color films for projecting purposes. According to this method two series of component color pictures arranged in close proximity on one film are projected by means of a single source of light utilizing a mechanical separation of the beams, whilst avoiding any crossings of the path of the beams, to the front and back of a second film sensitized on both sides so that the two pictures coincide with each other.

A device for carrying into effect the method according to the present invention is illustrated on the accompanying drawings, in which Fig. 1 shows in a diagrammatic and perspective manner the device, Figs. 2–17 show films having various arrangements of the component pictures.

Referring to Fig. 1, 1 denotes a film and 2 is the other film which has to be produced from the film 1 as positive color film for projecting purposes. The component color pictures $a$ and $b$ of the vertically movable film 1 are arranged beside each other in the horizontal direction and point in the same direction. These component pictures have been printed by the aid of filters of different colors and actinities, for instance the series of pictures $a$ with red filters and the series of pictures $b$ with green filters. 3 indicates a lamp serving as the single common source of light and 4 is the single rotary shutter. 5 and 6 are two objectives which separately collect the beams from each picture $a$ and $b$ respectively and a nontransparent wall 7 mechanically separates the beams of the two pictures. The beams $x$ of the picture $a$ are deviated by the prisms 8, 9, 10 and finally conducted towards one side of the film 2 of which both sides are sensitized, and the beams $y$ from the objective 6 are deviated by the prisms 11, 12 and 13 and are so conducted to the other sensitized side of the film 2 that the pictures $a$ and $b$ thrown on the film 2 coincide with each other. The paths of the beams $y$ and $x$ is so chosen that crossings of the beams are avoided. After developing the film 2 one side is colored red and the other side green so that the color film 2 gives colored cinematic pictures when projecting the film. Instead of prisms mirrors may be used.

Figure 7:
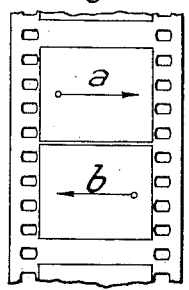
Figure 8:
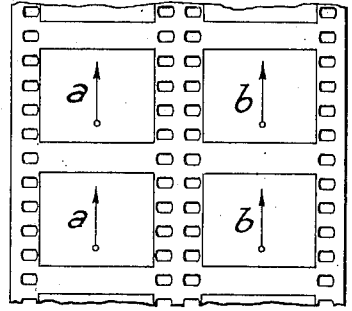
Figure 9:
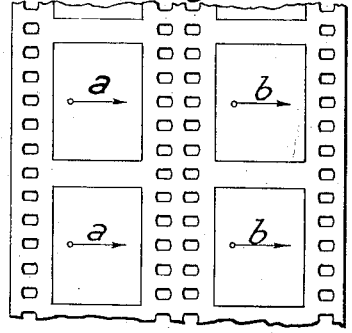
Figure 10:
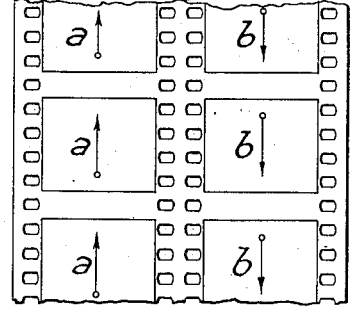
Figure 11:
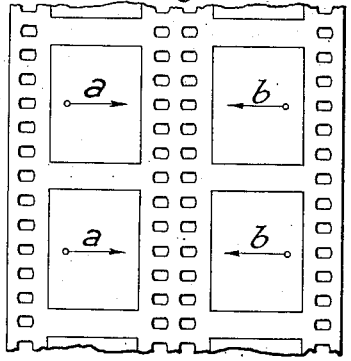
Figure 13:
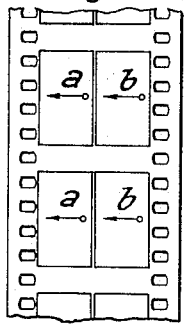

The pictures $a$ and $b$ on the film 1 may also be arranged one below the other and pointing in the upward direction (Fig. 2) or in the downward direction (Fig. 3), in which case the optics may preferably be so chosen that no enlargement of the pictures is caused. However the pictures $a$ and $b$ may also be arranged below each other and pointing away from each other (Fig. 4) or towards each other (Fig. 5), whereby an enlargement of the picture on film 2 may be avoided. The pictures arranged below each other may point towards the same side in the lateral direction (Fig. 6) or towards opposite sides (Fig. 7). Further the film 1 may have double the normal width and the pictures $a$ and $b$ may be arranged as is shown in Figs. 8–12. The pictures $a$ and $b$ may also be arranged beside each other on a film 1 of normal width and directed as is shown in Figs. 13–17.

Figure 14:
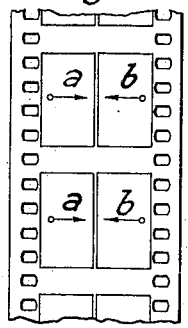
Figure 15:
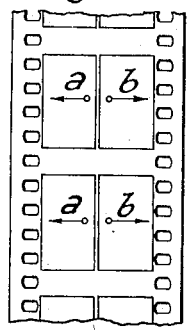
Figure 12:
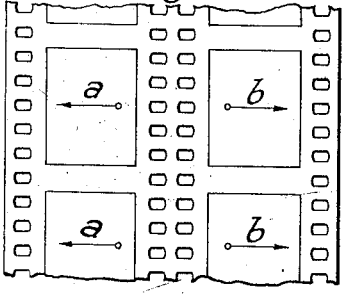
Figure 16:
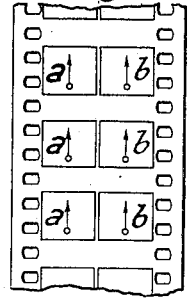
Figure 17:
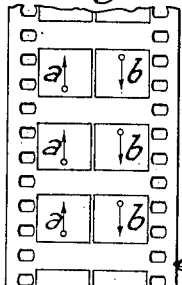

If the pictures $a$ and $b$ are arranged as is shown in Fig. 14 the film 1 is moved in the vertical direction and an inversion of the pictures $a$ and $b$ is not necessary however, both pictures are turned into the upward direction. In case the film moves in the horizontal direction it is not necessary to turn the picture into the upward direction.

The optical means interposed between the objectives 5 and 6 and the film 2 are adapted to the particular arrangement of the pictures on the film 1, the result is the same in every case, i. e. the two series of pictures are copied one to one sensitized side of the film 2 and the other to the other sensitized side of the film 2 and both appertaining pictures on that film coincide.

We claim:

1. A method of producing color films for projecting purposes, which consists in projecting of two series of component color pictures of the same size arranged side by side on one film simultaneously and by means of a single source of light one series to one side of a film sensitized on both sides and the other series to the other side so that every two pictures coincide.

2. Method of producing colored films for projecting purposes, which comprises sending light from a single source through a closely adjacent pair of correlated pictures on a first film in parallel rays maintained separate, and separately focusing these rays simultaneously to separate optical reflecting systems onto opposite sensitized surfaces of a second film in registering positions of the same height as the pictures on the first film and then stepping both films the same distance.

3. Method of producing colored films for projecting purposes, which comprises sending light from a single source through a closely adjacent pair of correlated pictures on a first film in parallel rays maintained separate, and separately and simultaneously focussing these rays to separate optical reflecting systems onto opposite sensitized surfaces of a second film in registering positions of the same height as the pictures on the first film and then stepping both films the same distance in the same direction.

4. Method of producing colored films for projecting purposes, which comprises sending light from a single source through a closely adjacent pair of correlated pictures on a first film in parallel rays maintained separate, and separately and simultaneously focussing these rays to separate optical reflecting systems onto opposite sensitized surfaces of a second film in registering positions of the same height as the pictures on the first film and then stepping both films the same distance in the same direction, the normal picture height.

5. A method of producing color films for projecting purposes, which comprises passing light from a single source through a single shutter common to a pair of closely adjacent pictures on a film, separating the light passing through the individual pictures on the film and simultaneously directing each portion through a separate optical system perpendicularly onto opposite sides of a second film sensitized on both sides, in registering relation.

6. Mechanism for producing color films for projection purposes, comprising a single source of light, a single shutter for controlling the light from said source through a film containing pairs of closely adjacent pictures, means arranged close to the film to mechanically maintain the light passing through the pictures of a pair separate and parallel, means to focus the light from each picture of a pair to a separate optical system to direct the light simultaneously and perpendicularly onto opposite faces of a second film.

7. Mechanism for producing color films for projection purposes, comprising a single source of light, a single shutter for controlling the light from said source through a negative film containing pairs of closely adjacent pictures, means arranged to mechanically maintain the light passing through a pair of pictures separate and parallel, means to focus the light from each negative picture of a pair to a separate optical system to direct the light simultaneously and perpendicularly onto opposite faces of a second film coated on both sides so that the two images register with one another and the paths of the light from the negative film to the second film being substantially equal, to maintain the relative intensity of the registering positives proportionate to the negatives, both films being fed in the same direction.

8. The method of producing films for color projection purposes, which comprises sending light from a single source through a closely adjacent pair of correlated negatives of a negative film to a positive film coated on both sides, through separate optical systems, and simultaneously and separately focussing said rays on the positive film at right angles thereto to register the images on opposite sides of the positive film, said rays passing from the negative to the positive film through equal paths, and simultaneously feeding both films in the same direction.

In testimony whereof we have signed our names to this specification.

OTTO PILNY.
ALEX PILNY.